Aug. 22, 1939.  J. D. LANE  2,170,147
PACKAGE OF GUMMED BANDS OR STICKERS
Filed Jan. 21, 1937
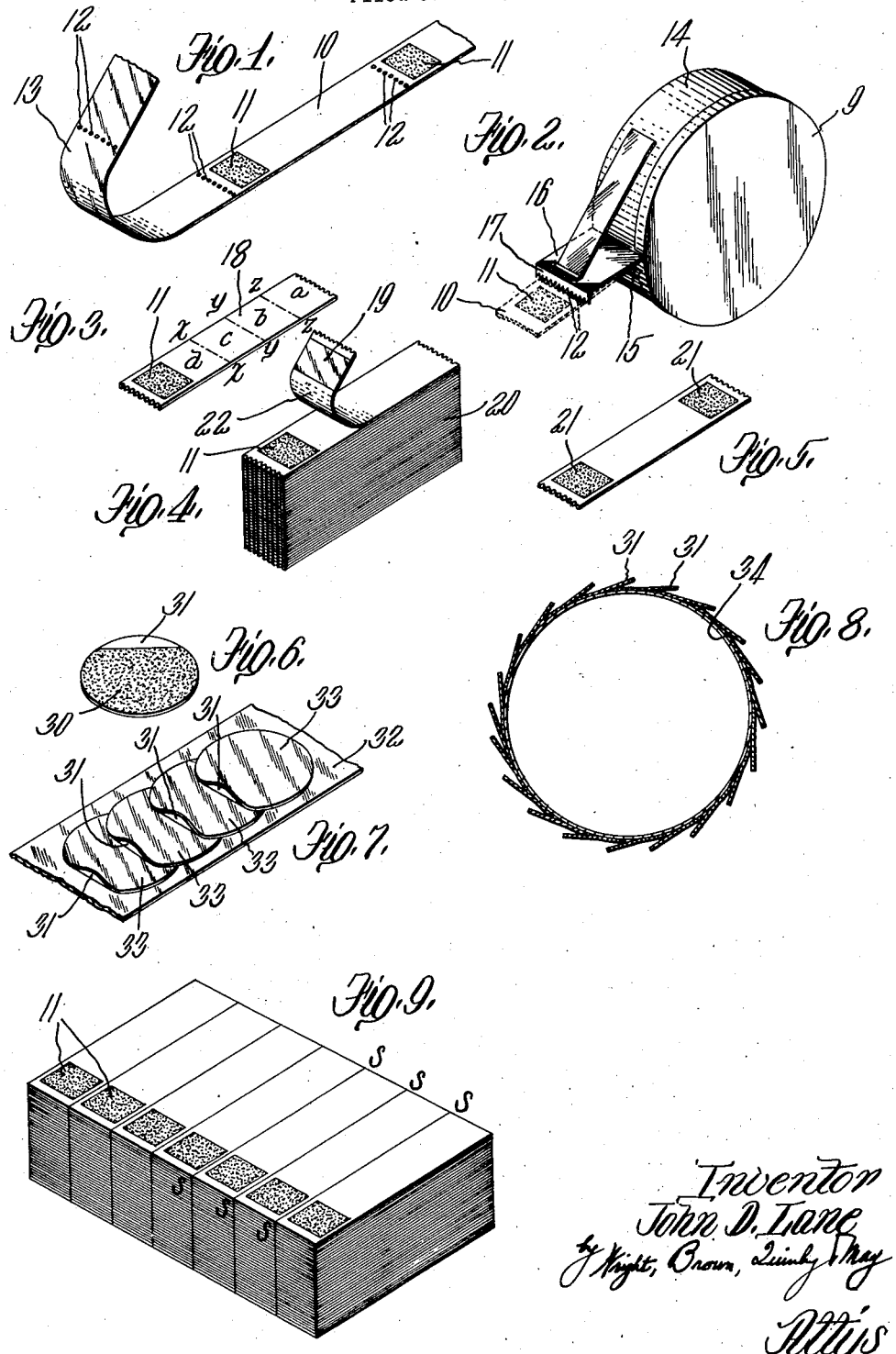
Inventor
John D. Lane
by Knight, Brown, Quimby & May
Attys Patented Aug. 22, 1939

2,170,147

UNITED STATES PATENT OFFICE 2,170,147

PACKAGE OF GUMMED BANDS OR STICKERS

John D. Lane, Boston, Mass.

Application January 21, 1937, Serial No. 121,392

6 Claims. (Cl. 206—56)

This invention relates to packages of gummed bands or stickers more particularly of a kind presenting one or more permanently sticky gummed surface portions. An objective, generally speaking, is to provide a package of bands whose end portions may be stuck together, for instance, when applied as a binder about various objects so that its end portions overlap, or whose end portions may be stuck to separate surfaces, for instance, when looped over the upper end portions of a pair of stockings so that its end portions contact with opposite faces of the pair, and in which package the bands are in superposed or overlapping relationship with only temporary or weak sticking, if at all, to one another and, accordingly, with minimum difficulty in removing the bands or stickers individually from the package for use.

The gummed bands or stickers hereof are characterized by being coated only locally on one face with permanently adhesive or tacky gum and by being coated on the opposite face at least over an area directly in back of the gummed area with a composition of low adhesive affinity for the permanently adhesive or tacky gum and hence affording what may be regarded as an insulator for such coated opposite face area against the gum. While cloth or other flexible sheet material might be used in making the bands or stickers hereof, paper affords economical and satisfactory base material; and the present invention will thus be described in terms of paper as the base material. The permanently adhesive or tacky gum may be a rubber latex compounded with a suitable amount of resin, such as paracoumarone or pitch, and a mineral oil or other substantially involatile liquid rubber-plasticizer, which compounding agents serve to maintain the rubber coating deposited from the latex permanently swollen and tacky; or such permanently adhesive gum may be a crude rubber cement containing the resin and substantially involatile liquid rubber-plasticizer together with sufficient volatile rubber solvent, such as benzol, to impart to the gum the desired fluency or spreading properties. In the event that a properly compounded rubber latex is employed, the resin and oil to be compounded therewith are preferably first individually or jointly emulsified in water, as by the use of soap or other suitable emulsifying agent, and then commingled with the latex to produce a composition from which the permanently tacky gum may be deposited. On the other hand, the compounding of crude rubber, such as pale crepe, to form the desired gum, may be done in the usual rubber-cement mixer or churn, the benzol or other volatile rubber solvent, the resin, and the oil or other involatile liquid rubber-plasticizer being separately or jointly added to the rubber batch and mixing continued until a smooth or homogeneous cement of the appropriate consistency for spreading or coating onto the paper base is realized. I need not dwell further on such permanently adhesive or tacky gums as may be used for the purpose hereof, since they are well known to those skilled in the art. Suffice it to say that the coating of permanently adhesive gum is deposited from a fluent or spreadable composition that preferably lends itself to application as a thin coating onto paper and that contains water, volatile rubber solvent, or like vehicle, which is evaporated from the spread composition or coating to leave such composition in an essentially non-fluent but permanently tacky state.

The adhesive-insulating composition applied at least over that paper area directly in back of the gummed or gum-coated paper area may be a glue, casein, or similar aqueous sizing or coating composition containing glycerine as the element having low adhesive affinity for the gum. It is also possible to use glycerine alone for such insulating purpose or such equivalents of glycerine as ethylene glycol, sulphonated oils, such as sulphonated castor oil, etc. It is generally preferable, however, to coat the appropriate paper area with an aqueous sizing composition containing the glycerine or its equivalent, since the dried coating of glue, casein, or other size imparts smoothness to such area and to increase the resistance of such area against the strong sticking thereto of the gummed paper area. The glycerine or its equivalent serves the further function of flexibilizing the paper and the coating of size applied thereto. When an aqueous glue-glycerine mixture or composition serves as the adhesive-insulating coating, it is preferable that such composition also contain a tanning or insolubilizing agent for the glue, such as formaldehyde or alum, as the tanning or insolubilization of the glue that takes place when the composition is dried hardens it and destroys such residual tackiness as might otherwise be possessed thereby after the aqueous component of the composition is evaporated.

With the foregoing and other features and objects in view, the present invention will now be described in greater detail with reference to the accompanying drawing, wherein, Figure 1 depicts in perspective a continuous strip or tape locally gummed on one face and perforated at suitably spaced intervals so as to permit the ready severance therefrom of individual gummed labels embodying the present invention.

Figure 2 shows a dispensing container for a roll or spool of the continuous strip of Figure 1 and indicates in dotted outline the dispensing of a strip length to constitute a label.

Figure 3 illustrates in perspective an individual label such as may be severed from the continuous strip of Figure 1.

Figure 4 similarly depicts a plurality of bands embodying the invention hereof stacked into a pile for packaging.

Figure 5 illustrates in perspective another form of band or label whose end portions are gummed for sticking to different surfaces rather than in overlapping relationship.

Figure 6 shows the gummed face of a sticker or label embodying the invention hereof and designed to be packaged more particularly in overlapping relationship with other similar stickers or labels.

Figure 7 illustrates one mode of packaging the stickers of Figure 6.

Fig. 8 illustrates another mode of packaging the stickers of Figure 6.

Figure 9 indicates the way in which a plurality of superposed precoated or gummed sheets may be cut into bands or labels for stacking into a pile, such as is illustrated in Figure 4.

Referring first to Figure 1, the continuous strip or band 10 of paper is shown as being coated on one face at regularly spaced longitudinal intervals over a relatively small square area with permanently adhesive or sticky gum 11, such as has already been described. The boundaries of the gummed area 11 are preferably spaced slightly from the side edges of the strip and from spaced lines of perforation 12 preformed in the strip so as to enable ready severance or tearing of a succession of gummed individual bands from the strip. The entire back face 13 of the strip may be coated, as shown, with the composition having low adhesive affinity for the gum on the areas 11. This means that the continuous strip or tape 10 can be convoluted into a roll with only weak bonding of the gummed areas 11 of one convolution with the face 13 of an adjacent convolution. Accordingly, the strip of Figure 1 may advantageously be packaged as a roll and individual gummed bands successively severed or torn therefrom along the lines of perforations 12. Thus, a roll or spool of such tape may be confined in the cylindrical dispensing box or container 14 shown in Figure 2 as having a removable end closure 9 and a peripheral wall transversely slotted as at 15 to enable a progressive withdrawal or dispensing of the tape from the enclosed roll. Projecting outwardly from the peripheral wall adjacent to the slot 15 may be a guiding member 16 having a downturned serrated edge 17 against which the tape may frictionally bear as it is being withdrawn from the roll until the serrations of such edge engage in a line of perforations 12, at which time the tape is stopped by the serrations and may be cut off as an individual label, such as appears in Figure 3. Such a label or tag may be affixed by its gummed area 11 to items of wearing apparel or the like and carry such information as price, size, etc., written or imprinted on its ungummed area 18. If desired, the ungummed area 18 may be creased or scored along transverse lines so as to permit easy tearing of successive portions of the label when it is desired to alter the price or other information to be conveyed by the label. Such lines of score, which are indicated by the dotted lines $x—x$, $y—y$, and $z—z$, enable the price or other designation to be written or imprinted successively on the portions $a$, $b$, $c$, and $d$ of the label. When the price or other information written or imprinted on the portion $a$ is no longer to be in force, such portion may be torn away from the label; and the portions $b$ and $c$ of the label may similarly be successively used and torn from the label when the information to be given by the label is to be changed. Because the face or area 18 of the paper that is free from the adhesive-insulating composition takes printing better than that coated with such composition, it is preferable that such free or uncoated face receive such printed information as is to be given by the label, in which case such information lies next to the labeled article and is presented to view by turning back or reversing the label.

The form of band or label appearing in Figure 4 is intended more particularly for use as a binder about ironed or folded shirts, wrapped cakes, or other packages, for which purposes the end portions of the band are brought together into overlapping relationship. In order that the overlapping end portions of the band may stick or bond together with the desired tenacity, it is desirable that the back face of the band be coated with an adhesive-insulating medium 19 only over that area directly in back of the gummed area 11. It is, accordingly, possible to stack the bands directly on top of one another as a pile 20, as shown in Figure 4, with only weak bonding, if at all, between the superposed bands by reason of the adhesive-insulating coating or medium 19 on one band contacting with and masking the gummed area 11 of an underlying or adjacent band. By confining the insulating medium 19 to that area of the back face of a band directly in back of the gummed area 11 of the same band, it becomes possible also to print on the band properly on most of its back face 22, which latter face, it will be appreciated, becomes the exposed or visible face of the band when it is put to use as a binder. In this latter connection, it might be mentioned that the glycerine, glue-glycerine composition, or other adhesive-insulating medium 19 detracts materially from the printing qualities of the paper surface to which it is applied; and, when it is desirable to print advertising matter or the like on the band surface exposed to view when the band is in use, it is hence distinctly preferable to restrict such adhesive-insulating medium to the smallest area enabling adhesive-insulation of the bands from one another in a pile.

The form of band shown in Figure 5 is provided with gummed areas 21 at opposite end portions of the same face. Such a band is useful for such purpose as looping over the upper end portions of a pair of stockings with its gummed areas 21 stuck to opposite faces of the pair and thus serving to hold the pair together. Such a looped label may carry suitable advertising matter, price designation, etc. on its exposed face. As in the case of the label of Figure 3, each gummed area 21 is preferably spaced somewhat from the marginal edges of the band; and, as in the case of the label of Figure 4, only those back areas of the band immediately or directly in back of the gummed areas 21 are coated or insulated against sticking to the gummed areas so as to enable piling of the bands into a stack for packaging and the proper printing of most of the back face of the band, which latter face becomes the exposed face of the band when the band is put to use. The band of Figure 5 may also serve advantageously as a sealing element for advertising folders such as are sometimes sent through the mails, for which purpose the band is looped over the edges of the folder to be sealed with its gummed areas 21 affixed to opposite faces of the folder.

By virtue of the spacing of the boundaries of the gummed areas 11 from the edges of the band shown in Figure 4, it becomes possible to cut such bands from a properly precoated or gummed sheet or a plurality of such superposed sheets without gumming the cutting knife and without undesirably fusing together the edges of resulting superposed bands. Indeed, the manner of cutting bands from a plurality of superposed precoated or gummed sheets may be essentially that depicted in Figure 9, according to which the precoated sheets stacked into a pile with the gummed areas 11 of each sheet separated from one another and from a side edge of the pile by appropriate spacing, may be cut by a knife transversely along the lines s—s lying between the gummed areas so as to form a succession of stacks of bands lending themselves to packaging as already described in connection with Figure 4. Of course, the areas of each of the superposed sheets immediately in back of the gummed areas 11 are coated with the adhesive-insulating medium that prevents undesirable sticking or bonding together of the superposed sheets. Unless ungummed spaces are provided at those regions of the precoated or gummed sheet where the cutting edge acts, it becomes impossible to cut the bands from a precoated or gummed sheet or a plurality of such superposed sheets without fouling or gumming of the cutting knife and without fusing or bonding together unduly the edge portions of the resulting superposed bands. Again, by providing ungummed margins in a paper band about the gummed area or areas, as is true of the various forms of bands described, the possibility of staining or fouling an article, such as a shirt, being bound by the band is precluded, since such exudation or displacement of gum as may occur when the end portions of the band are brought into overlapping relationship does not result in undesirable displacement of gum onto the article being bound but rather onto the ungummed extra or marginal areas of the band surrounding the originally gummed area.

In Figure 6 is shown a sticker or label of disc form presenting on one face a largely gummed area 30 and a relatively small ungummed segment 31 for grasping by the fingers. Such a sticker or label is preferably coated over its entire back face with an adhesive-insulating composition so as to enable the packaging of a plurality of such stickers in compact overlapping relationship. Such stickers or labels may be packaged or assembled in overlapping relationship with their gummed faces lying down against a backing or supporting tape of paper 32 whose face in contact with such stickers or labels is also coated with the composition hereinbefore described having low adhesive affinity for the gum so that such labels or stickers are temporarily held or fixed in overlapping relationship against one another and against such backing tape 32 and may be readily removed individually for use. Such stickers or labels present for grasping the ungummed segments 31, which may be bent upwardly or aw; " from the backing strip 32 for easy grasping by the fingers. Stickers or labels of this type may serve the purpose of affixing temporary paper signs to windows; or they may serve as price tags on items of wearing apparel, crockery, glassware, or the like. Of course, while the overlapping relationship of the stickers illustrated in Figure 7 makes for a desirable compact package, it is possible to place or temporarily affix such stickers in non-overlapping or flat relationship against the backing tape 32. In such latter case, it becomes unnecessary to coat the back faces 33 of the stickers, which are exposed to view when the stickers are put to use, with the adhesive-insulating medium. This latter mode of packaging the stickers with no adhesive-insulating medium on their faces 33 may be preferable in those instances when it is desired to print such faces with advertising or other information. In lieu of temporarily sticking the labels or stickers of Figure 6 against a flat paper strip or the like, they may be assembled in overlapping relationship about a cylindrical core 34, as shown in Figure 8, the surface of which core should, of course, be coated with suitable adhesive-insulating material as is the paper strip 32. When a cylindrical core is used as the backing or carrier for the stickers or labels hereof, it is possible to provide a multiplicity of layers of overlapping stickers or labels, such layers being separated from one another by interposed annular bands of paper whose surfaces in contact with the gummed sticker areas are coated with suitable adhesive-insulating medium. When one layer of stickers or labels is consumed, the interposed annular separator strip may be torn away from the package to expose the next layer of stickers or labels. It is possible, however, to dispense with separator strips and to build up successive layers of the stickers or labels directly on top of one another, the backs of the individual stickers being coated with adhesive insulating material, in which case, as an overlying sticker or label is removed, the grasping or free edge portion 31 of an underlying label is exposed ready for removal and use.

It is to be understood that the present invention is not limited to the use of any particular compositions for affording the permanently sticky or adhesive gum or to any particular compositions having low adhesive affinity for such gum, since, as already indicated, such compositions are known to those skilled in the art and are subject to considerable variation. The present invention deals more especially with bands or stickers carrying coatings of such compositions over particular areas and in such relationship to one another as to enable the advantageous fabrication of such stickers or bands and/or the advantageous packaging and use of such bands for a wide variety of purposes, as hereinbefore described. In using the term "paper" in the appended claims, it is to be understood that I mean to include thereby sheet materials, e. g. "Cellophane", fabrics, etc., that can be used as equivalents of paper as the base material for the bands or stickers hereof.

I claim:

1. In a package comprising a plurality of paper stickers each of which presents a face only partially coated with a permanently sticky gum and another face coated with a medium having low adhesive affinity for said gum, a carrier for said stickers also coated with said medium and against which said gum faces are temporarily and weakly stuck, said stickers being arranged in overlapping relationship so that a gummed area of one sticker is temporarily and weakly stuck to an opposite face of an adjacent sticker.

2. In a package comprising a plurality of paper stickers each of which presents a face only partly coated with a permanently sticky gum and another face coated with a medium having low adhesive affinity for said gum, a carrier for said stickers also coated with said medium and against which said gum faces are temporarily and weakly stuck, said stickers being arranged in overlapping relationship so that a gummed area of one sticker is temporarily and weakly stuck to an opposite face of an adjacent sticker and the ungummed portions of said stickers being bent away from said carrier so as to be readily grasped by the fingers.

3. In a package comprising a plurality of paper stickers each of which presents a face only partly coated with a permanently sticky gum, a carrier for said stickers coated with a medium having low adhesive affinity for said gum and against which said gummed faces are temporarily and weakly stuck with their ungummed portions bent away from said carrier so that each of said stickers may be readily removed from said carrier for use by grasping said ungummed portions by the fingers.

4. In a package comprising a plurality of paper stickers each of which presents a face only partly coated with a permanently sticky gum, a cylindrical carrier for said stickers whose periphery is coated with a medium having low adhesive affinity for said gum and against which said gummed faces are temporarily and weakly stuck in overlapping relationship with a gummed area of one sticker temporarily and weakly stuck to an opposite face of an adjacent sticker.

5. A package comprising a plurality of sticker sections arranged in overlapping relation, each section having a coating of permanently sticky gum on one face and a medium having low adhesive affinity for said gum on another portion contacting with the sticky gum coating of an adjacent section.

6. A package comprising a roll of sticker sections arranged in overlapping relation, each section having a coating of permanently sticky gum on one face and a medium having low adhesive affinity for said gum on another portion contacting with the sticky gum coating of an adjacent section.

JOHN D. LANE.